(12) United States Patent
Nishimura et al.

(10) Patent No.: US 7,404,573 B2
(45) Date of Patent: Jul. 29, 2008

(54) GAS GENERATOR

(75) Inventors: Tsuyokazu Nishimura, Hyogo (JP); Koji Tanaka, Hyogo (JP)

(73) Assignee: Nippon Kayaku Kabushiki-Kaisha, Tokyo (JP)

( * ) Notice: Subject to any disclaimer, the term of this patent is extended or adjusted under 35 U.S.C. 154(b) by 310 days.

(21) Appl. No.: 10/502,705

(22) PCT Filed: Feb. 21, 2003

(86) PCT No.: PCT/JP03/01905

§ 371 (c)(1),
(2), (4) Date: Jul. 28, 2004

(87) PCT Pub. No.: WO03/070528

PCT Pub. Date: Aug. 28, 2003

(65) Prior Publication Data

US 2005/0052006 A1 Mar. 10, 2005

(30) Foreign Application Priority Data

Feb. 22, 2002 (JP) ............................ 2002-045640

(51) Int. Cl.
*B60R 21/26* (2006.01)
(52) U.S. Cl. .................................................... 280/736
(58) Field of Classification Search ................. 280/736, 280/740; 208/741
See application file for complete search history.

(56) References Cited

U.S. PATENT DOCUMENTS

| 6,032,979 A | 3/2000 | Mossi et al. |
| 6,149,193 A * | 11/2000 | Canterberry et al. ........ 280/741 |
| 6,189,927 B1 | 2/2001 | Mossi et al. |
| 6,315,322 B1 | 11/2001 | Mika |
| 6,899,351 B2 * | 5/2005 | Saso et al. .................. 280/736 |
| 2004/0061319 A1 * | 4/2004 | Saso et al .................. 280/741 |

FOREIGN PATENT DOCUMENTS

| DE | 299 20 123 U1 | 4/2000 |
| EP | 0 943 502 A1 | 9/1999 |
| EP | 1 155 927 A1 | 11/2001 |
| JP | 2001-353438 | 12/2001 |
| JP | 2003-089338 | 3/2003 |
| WO | 00/50273 | 8/2000 |

* cited by examiner

*Primary Examiner*—Christopher Ellis
*Assistant Examiner*—Robert A. Coker
(74) *Attorney, Agent, or Firm*—Oblon, Spivak, McClelland, Maier & Neustadt, P.C.

(57) ABSTRACT

A gas generator includes a cylindrical housing having an initiator shell provided with a plurality of igniter devices and a closure shell; a combustion chamber formed in the housing and loaded with gas generants; a cylindrical member that partitions the combustion chamber into two or more combustion chambers; and filter elements provided in the respective combustion chambers of the partitioned chamber wherein at least one of the filter elements is disk-shaped, and the respective combustion chambers are independent from each other.

10 Claims, 3 Drawing Sheets

GAS GENERATOR

TECHNICAL FIELD

The present invention relates to a situation-adaptive gas generator for airbag which enables controllable expansion and inflation of an airbag by burning a gas generant in a housing by a plurality of igniters.

BACKGROUND OF THE INVENTION

A gas generator for quickly expanding and inflating an airbag is installed in an airbag module which is installed in a steering wheel or an instrument panel for protecting a vehicle occupant from the impact resulting from an automobile collision. Then, the gas generator actuates an igniter (squib) in response to an electrical signal from a control unit (actuator) to burn a gas generant by a flame of this igniter for quickly generating a large quantity of gas.

In the case of conventional designs, the gas generator always makes an airbag quickly be expanded and inflated irrespective of the sitting position of the vehicle occupant (a normal sitting posture or an irregular sitting posture such as a stoop) and irrespective of the speed (acceleration) of the vehicle at the time of collision. Accordingly, it is difficult to control the inflation of an airbag in accordance with the sitting position of the vehicle occupant and the speed (acceleration) of the vehicle at the time of collision so that the airbag may not fulfill its primary function of protecting the vehicle occupant.

Hence, in recent years, situation-adaptive gas generators for airbag have been proposed and developed to control the inflation of an airbag in accordance with the sitting position of the vehicle occupant and the speed (acceleration) of the vehicle at the time of collision, for example, to provide a moderate inflation of the airbag at the first stage.

For example, U.S. Pat. No. 6,032,979 discloses a situation-adaptive gas generator in which are formed two combustion chambers, each having its own igniter, so that the gas generants loaded into the respective combustion chambers are burned one after the other. This is provided with a filter element as an annular member located along the inner peripheral portion of a housing, a first combustion chamber located inside the filter element and, in addition to this, a second combustion chamber located in the first combustion chamber and partitioned by a cylindrical tube with base in order that the first combustion chamber and the second combustion chamber can communicate through a plurality of orifices formed in the cylindrical tube with base. By this configuration, the situation-adaptive gas generator can operate suitably for the sitting position of the vehicle occupant by burning the respective gas generants loaded into the first combustion chamber and the second combustion chamber with a time difference.

However, because the first combustion chamber and the second combustion chamber can communicate with each other, the gas generated in the first combustion chamber can make the gas generant loaded into the second combustion chamber begin to burn with the fear of not generating gas with the predetermined time difference. In addition, the filter element is provided as an annular member located along the inner peripheral surface of the housing so that the gas and residue generated by the combustion in the respective combustion chambers are cooled and filtered by the single filter. Because of this, when the ignition pattern between the two combustion chambers is a simultaneous ignition, a staggered ignition or a single sided ignition, the gas as output may become thermally and/or compositionally inappropriate due to over- or under-cooling through the filter. Furthermore, the ignition order of the combustion chambers is fixed to the order from the outer peripheral side to the inner peripheral side, and therefore it may not be applied to a variety of collision patterns.

On the other hand, Japanese Patent Published Application No. Hei 11-59318 discloses a situation-adaptive gas generator with a housing whose inside space are partitioned to form two combustion chambers in the upper and lower sides in the x-axis direction with an igniter provided for each combustion chamber so that the gas generants loaded into the respective combustion chambers are burned one after the other to output gas. This is costly because of the annular filter elements provided in the respective combustion chambers.

It is an object of the present invention to provide, at a low cost, a situation-adaptive gas generator having a combustion chamber which is partitioned into two or more chambers, and filter elements which can be independently used.

DISCLOSURE OF THE INVENTION

In order to solve the problem as described above, the gas generator in accordance with the present invention comprises: an initiator shell provided with a plurality of igniter devices and a closure shell; a combustion chamber formed in said housing and loaded with gas generants; a cylindrical member that partitions said combustion chamber into two or more combustion chambers; and filter elements provided in the respective combustion chambers of the partitioned chamber wherein at least one of said filter elements is disk-shaped, and said respective combustion chambers are independent from each other.

Even when the inside of the housing is surely partitioned into two chambers while a filter element is provided in each of the respective combustion chambers, it is possible to realize, at a low cost, the structure in which the respective combustion chambers are not communicating with each other and are functionally independent from each other. Because of this, the gas generated in one combustion chamber is prevented from flowing directly into the other combustion chamber without cooling and filtering, and therefore the respective combustion chamber can be independent from each other. In addition, it is possible to adjust the respective characteristics for each combustion chamber independently of the other. Furthermore, since a filter element is provided separately for each combustion chamber, it is possible to have the filter elements fully perform their functions respectively.

Also, at least one of said combustion chambers of the gas generator according to the present invention is restricted in the axial direction of the gas generator by a partition member.

By restricting at least one combustion chamber in the axial direction of the gas generator by the partition member, the combustion product including gas is prevented from being transmitted between the one combustion chamber and the other combustion chamber and therefore combustion independently takes place within each combustion chamber. Also, a space can be formed above this partition member to provide a flow path allowing a gas to flow from the other combustion chamber.

Furthermore, in the case of the gas generator according to the present invention, an orifice plate formed with a plurality of orifices is provided in said cylindrical member.

Since the orifice plate formed with the plurality of orifices is provided in the cylindrical member, the gas generated in the combustion chamber in the cylindrical member can be discharged out of the cylindrical member through the orifices.

Because of this, the gas emission characteristics can be controlled by adjusting the hole diameter, the number and the like of the orifices.

Furthermore, in the case of the gas generator according to the present invention, a plurality of orifices are integrally formed with the base portion of said cylindrical member.

Since the plurality of orifices are integrally formed with the base portion of the cylindrical member, it is possible to reduce the parts count and simplify the structure inside the housing.

Still further, in the case of the gas generator according to the present invention, said partition member is formed as a corrugated plate in order to avoid deformation and secure a flow path of the gas generated in said cylindrical member.

Since the partition member is formed as a corrugated plate in order to avoid deformation and secure a flow path of the gas generated in the cylindrical member, the gas generated in the cylindrical member is surely discharged out of the housing. Also, in the light of the profile of the corrugated plate, the strength is improved to sufficiently withstand the pressure applied during gas generation and inhibit deformation due to the gas pressure. In this case, the profile of the corrugated plate is preferably designed to radiate from the center of the partition member toward the outer perimeter thereof.

BEST MODE FOR CARRYING OUT THE INVENTION

In what follows, with reference to the drawings, an exemplary embodiment of the gas generator in accordance with the present invention will be explained.

Figure 1:
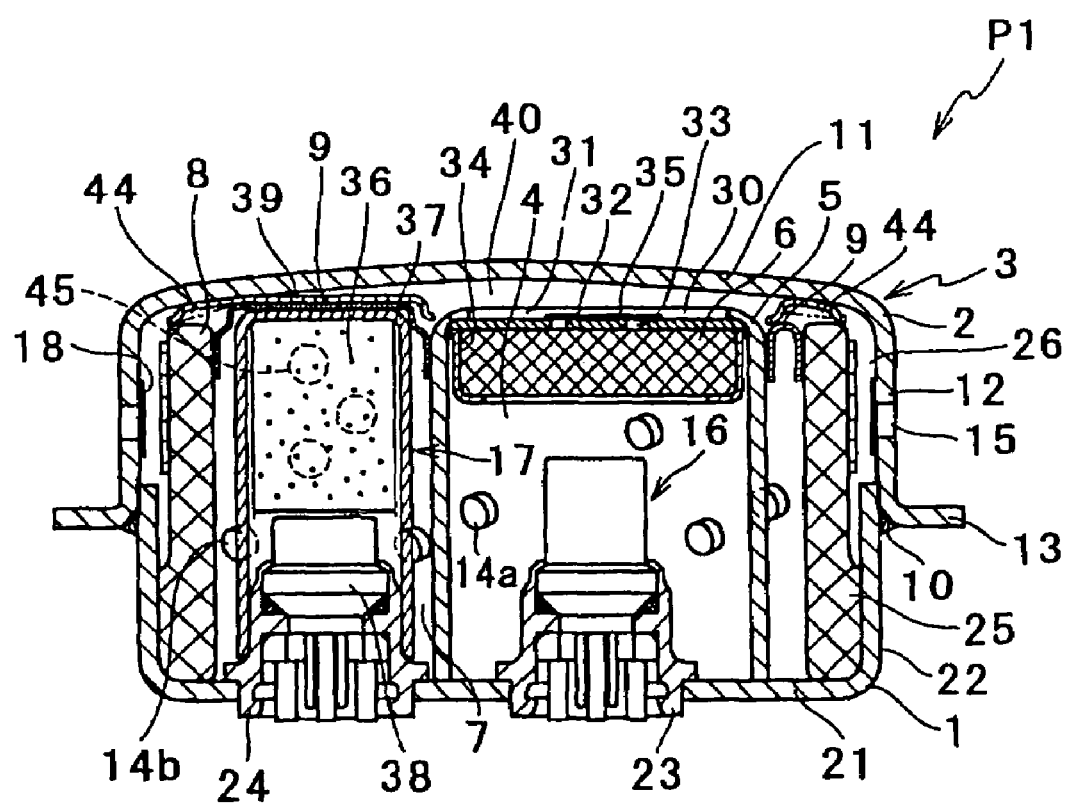
FIG. 1 is a sectional view showing a gas generator P1 in accordance with a first exemplary embodiment of the present invention.

FIG. 1 is a sectional view showing a gas generator P1 in accordance with a first exemplary embodiment of the present invention. In FIG. 1, the gas generator P1 is provided for expanding and inflating an airbag for a driver's seat and includes a cylindrical housing 3 comprising an initiator shell 1 and the closure shell 2, a cylindrical member 5 located in the housing 3 for forming a second combustion chamber 4, a disk-shaped second filter element 6 located in this cylindrical member 5, a ring-shaped first filter element 8 located along the inner peripheral surface of the housing 3 in order to internally define a first combustion chamber 7, a partition member 39 restricting the inside of the housing 3 in the axial direction of the gas generator, gas generants 14a and 14b loaded into the respective combustion chambers 4 and 7, and igniter devices 16 and 17 provided in the respective combustion chambers 4 and 7. Then, the initiator shell 1 and the closure shell 2 are butt and joined at a joint 10 by welding and the like. Alternatively, the initiator shell 1 and the closure shell 2 can be joined by a suitable method other than welding such as crimping.

The closure shell 2 constituting the cylindrical housing 3 is composed of a roof portion 11, a cylindrical side portion 12 extending from the roof portion 11 toward the initiator shell 1, and a flange portion 13 axially outwardly projecting from the cylindrical side portion 12. The cylindrical side portion 12 is formed with a plurality of gas discharge openings 15 through which the gas generated by the combustion of the gas generants 14a and 14b is discharged. A rupture member 18 such as an aluminum tape is attached to the gas discharge openings 15 in the inside surface of the cylindrical side portion 12. This prevents external moisture and the like from entering the inside of the housing 3.

The initiator shell 1, which is butt and joined with the closure shell 2 by welding, crimping or the like, is composed of a base portion 21, and a cylindrical side portion 22 extending from the base portion 21 toward the closure shell 2. Cylindrical igniter device holding portions 23 and 24 are provided on the base portion 21 for supporting the igniter devices 16 and 17. The igniter device 16 and an igniter 38 as a component of the igniter device 17 are fixed respectively to the igniter holding portions 23 and 24 by caulking. Incidentally, the igniter device as used herein may be a simple igniter for igniting by supplying electric power from the control unit, or may include, in addition to this, an enhancer agent and its container and the like located in the gas generator for ensuring the ignition of the gas generant.

The first filter element 8 is located along the inner peripheral walls of the cylindrical side portions 22 and 12 of the housing 3 comprising the closure shell 2 and the initiator shell 1 and, for example, made at a low cost of a metal wire material such as a stockinet metallic mesh, a flat-woven metallic mesh or a crimp metallic mesh as aggregated in the form of a cylinder. Preferably, by the use of a stockinet metallic mesh, it is possible to use a press forming technique for forming it in an arbitrary profile. This first filter element 8 is formed with a convex portion 25 at its outer surface in the lower side of the housing 3. The convex portion 25 thereby abuts against the inner peripheral wall of the cylindrical side portion 22 of the initiator shell 1 to ensure the positioning in the housing 3. Also, by virtue of the convex portion 25 which is always in contact with the initiator shell 1, it is possible to prevent the combustion gas from bypassing from the first combustion chamber. Furthermore, by virtue of the convex portion 25, a space 26 is formed between the inner wall of the housing 3 and the first filter element 8. By forming the space 26, the gases, to be described below, respectively output from the first combustion chamber 7 and the second combustion chamber 4 can be accumulated and mixed in this space 26 and discharged through the gas discharge openings 15.

The cylindrical member 5 with base partitioning the inner space of this first filter element 8 into two chambers is arranged to enclose the igniter device 16 which is eccentrically located on the base portion 21 of the initiator shell 1. The cylindrical member 5 is fixed to the initiator shell 1 by an arbitrary method such as crimping, welding or caulking. Then, the inside thereof is loaded with the gas generant 14a to form the second combustion chamber 4.

The base portion 30 of this cylindrical member 5 is formed with a hole 31, and provided with an orifice plate 32 having a plurality of orifices 33 in order to cover this hole 31. This orifice plate 32 is fixed to the base portion 30 of the cylindrical member 5 by an arbitrary method such as caulking. The disk-shaped second filter element 6 is located to abut on this orifice plate 32 and supported by a plate member 34 in the form of a chassis. The plurality of orifices 33 formed in the orifice plate 32 are sealed by a rupture member 35 such as an aluminum tape. The disk-shaped second filter element 6 serves as a reinforcement member of the rupture member 35 against the differential pressure between the inside and outside of the rupture member 35 when the gas generant 14b of the first combustion chamber 7 is first ignited. It is therefore possible to provide a reliable sealing even if the rupture member 35 has less strength than conventional counterparts.

The inside of the housing 3 is restricted in the axial direction of the gas generator by the partition member 39, which vertically partitions the inside of the housing 3 to form the first combustion chamber 7 in the outer peripheral side of the above second combustion chamber 4.

The igniter device 17 located in the first combustion chamber 7 is composed of a cylindrical tube 37 with base internally loaded with an enhancer agent 36, and the igniter 38 to be ignited by supplying electric power thereto from the control unit. The cylindrical tube 37 is formed with ignition holes 45 for outputting the flame of the enhancer agent 36, which is ignited and burning, to the first combustion chamber 7. Incidentally, the enhancer agent 36 as used herein may be any enhancer agent as long as it can be normally used. This first combustion chamber 7 is loaded with the gas generant 14b.

Also, the gas generator P1 according to this exemplary embodiment is provided with a bypass preventing member 9 below the partition member 39 for avoiding the entry of the combustion gas through the edge of this partition member 39.

The partition member 39 is formed as a corrugated plate. By this configuration, it is possible to prevent the partition member 39 from being deformed and, in addition to this, secure a flow path through which the gas flowing from the second combustion chamber 4 into a space 40 can be discharged from the gas discharge openings 15 through the space 26.

The gas generator P1 according to this exemplary embodiment is configured as has been discussed above, and therefore the second combustion chamber 4 and the first combustion chamber 7 are not communicating with each other and are functionally independent from each other. Because of this, the gas generated in one combustion chamber does not flow into the other combustion chamber without cooling and filtering.

The gas generator P1 configured as has been discussed above is installed in an airbag module to be placed in a steering wheel. Then, the respective igniter devices 16 and 17 of the gas generator P1 are respectively connected to vehicle side connectors, which are not shown in the figure, and thereby connected to the control unit.

The control unit is composed of a crash sensor (acceleration sensor) for detecting the collision of the automobile, a step up circuit for supplying electric power to the respective igniter devices 16 and 17, a backup capacitor and a squib (igniter) drive circuit, and controlled by a microcomputer.

When the crash sensor detects the collision of the automobile, the gas generator P1 connected to the control unit actuates (electrically ignites) only the igniter device to be first ignited, for example, the igniter device 17 by the squib drive circuit connected to the igniter 38 which is a component of the igniter device 17 in order to burn the gas generant 14b in the first combustion chamber 7 and generate a high temperature gas. The gas generated in the first combustion chamber 7 then flows into the first filter element 8 for cooling and filtering, and is discharged from the gas discharge opening 15 through the space 26. Since only the gas generant 14b in the first combustion chamber 7 burns at this stage, the airbag starts moderately expanding and inflating.

After starting the combustion in the first combustion chamber 7, the igniter device 16 is actuated (electrically ignited) with a very small time lag by the squib drive circuit controlled by the microcomputer of the control unit. Then, the gas generant 14a in the second combustion chamber 4 is burned to generate a high temperature gas.

The high temperature gas generated in the second combustion chamber 4 flows into the disk-shaped second filter element 6 for cooling and filtering, and then into the space 40 through the orifices 33. The gas flowing into the space 40 is passed through a concave portion 44 formed of the partition member 39 and discharged from the gas discharge openings 15 through the space 26. In this case, the gas flowing into the space 26 is mixed with the gas output from the first combustion chamber 7, and discharged from the gas discharge openings 15. As a result, at the next stage, the airbag starts quickly expanding and inflating by a large quantity of clean gas discharged from the respective combustion chambers 4 and 7.

While the actuation of the respective igniter devices 16 and 17 has been illustratively explained as an example of actuating the igniter device 17 first, it is also possible to actuate the igniter device 16 first and, in addition to this, the very small time lag is not necessarily inserted on every occasion, but only inserted when appropriate in accordance with the automobile collision pattern. Incidentally, even if the igniter device 16 is actuated first, the gas generated in the second combustion chamber 4 does not flow into the first combustion chamber 7 without cooling and filtering.

As thus described, since the respective combustion chambers 4 and 7 are independent from each other, it is possible to load the respective combustion chambers 4 and 7 with the gas generants 14a and 14b which are compositionally equivalent or different and to generate different amounts of gas generated from the respective combustion chambers 4 and 7. Also, it is possible to control various characteristics relating to the gas generation by adjusting the hole diameter, the number and the like of the orifices 33. Furthermore, since the respective combustion chambers 4 and 7 are independent from each other, the way of expanding and inflating an airbag can be controlled in accordance with the current situation by adjusting the ignition times of the igniter devices 16 and 17 provided for the respective combustion chambers 4 and 7.

For example, in the case of extremely dangerous collision such as a head-on clash or a frontal clash at a high speed, the respective igniter devices 16 and 17 are actuated (electrically ignited) at the same time in order to quickly expand and inflate an airbag by a large quantity of gas generated in the respective combustion chambers 4 and 7. Alternatively, in the case of moderately dangerous collision, the respective igniter devices 16 and 17 are successively actuated (electrically ignited) with a very small differential time in order to moderately expand and inflate an airbag by a small quantity of gas at the initial stage, and after the very small differential time, to quickly expand and inflate the airbag by a large quantity of gas. Furthermore, in the case of lesser dangerous collision, only the igniter device 16 or 17 is actuated (electrically ignited) in order to moderately expand and inflate an airbag by a small quantity of gas for a relatively long time.

Figure 2:
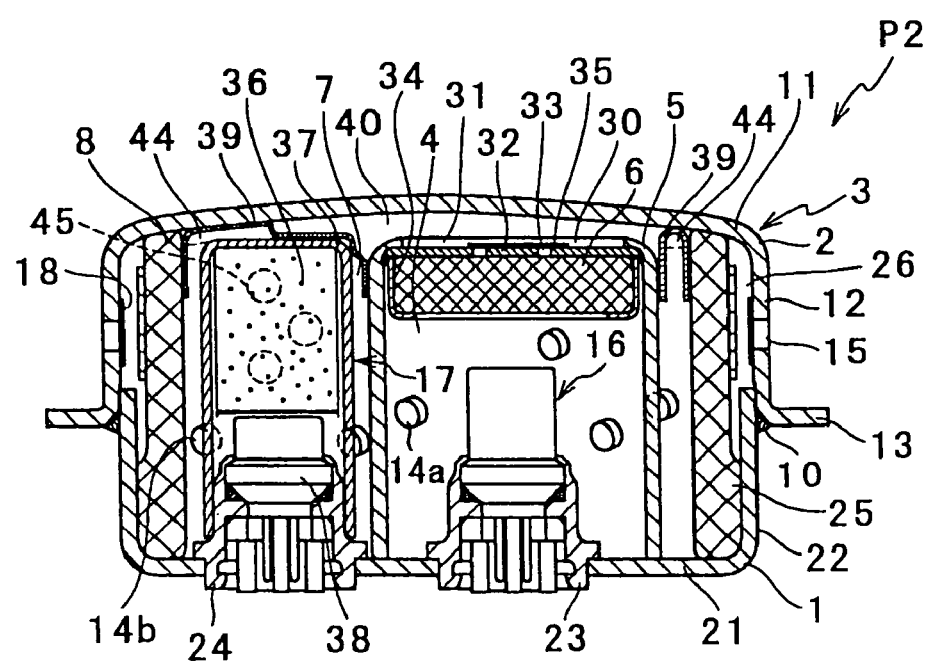
FIG. 2 is a sectional view showing a gas generator P2 in accordance with a second exemplary embodiment of the present invention.

Next, FIG. 2 is a sectional view showing a gas generator P2 in accordance with a second exemplary embodiment of the present invention. Meanwhile, in FIG. 2, like reference numbers indicate the same elements as illustrated in FIG. 1, and detailed explanation is omitted.

In the gas generator P2 as shown in FIG. 2, unlike in the gas generator P1 according to the above first exemplary embodiment, the first filter element 8 is provided to extend from the base portion 21 of the initiator shell 1 to the roof portion 11 of the closure shell 2. Because of this, the gas as output from the second combustion chamber 4 is first passed through the second filter element 6 provided in the cylindrical member 5 and then passed through the first filter element 8.

The partition member 39 of the gas generator P2 according to this exemplary embodiment has opposite ends bended to come in contact respectively with the first filter element 8 and the cylindrical member 5, and therefore the bypass flow of the combustion gas can be prevented.

Figure 3:
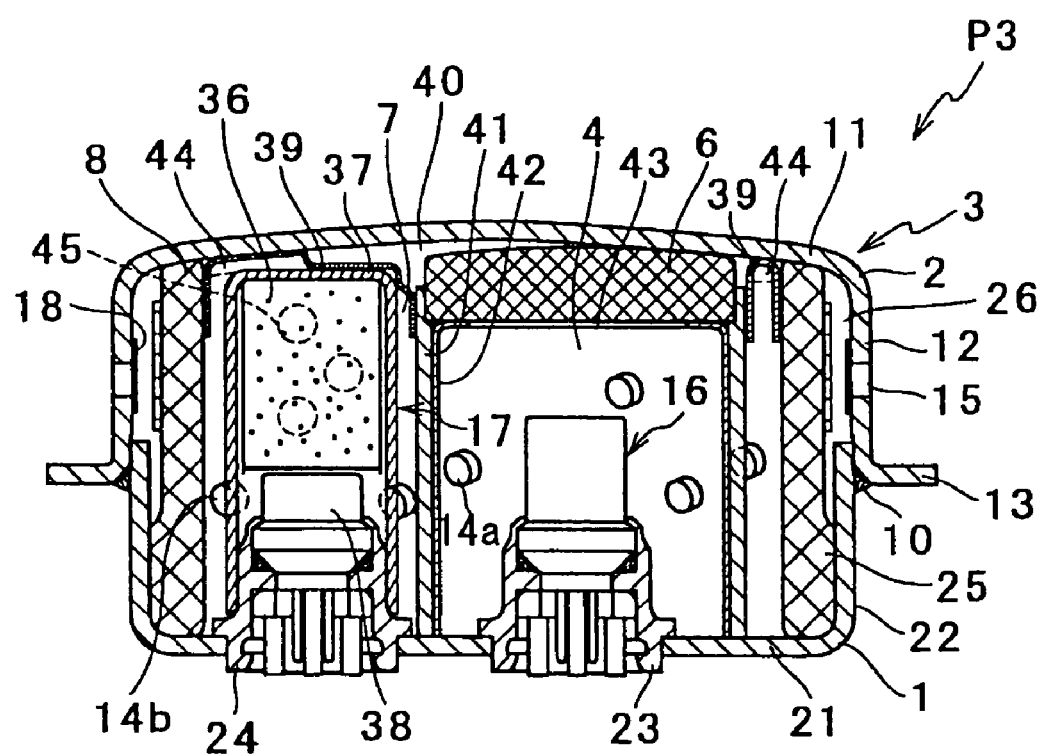
FIG. 3 is a sectional view showing a gas generator P3 in accordance with a third exemplary embodiment of the present invention.

FIG. 3 is a sectional view showing a gas generator P3 in accordance with a third exemplary embodiment of the present invention. Meanwhile, in FIG. 3, like reference numbers indicate the same elements as illustrated in FIG. 1, and detailed explanation is omitted.

In the gas generator P3 as shown in FIG. 3, unlike in the above gas generator P2, the disk-shaped filter element 6 is not loaded into the cylindrical member 5 as illustrated in FIG. 1 and FIG. 2 (refer to FIG. 1 and FIG. 2), but an inner cylindrical tube 41 is used in place of the cylindrical member 5 of FIG. 1 and FIG. 2 together with a cylindrical tube 42 with base which is formed with orifices 43 through its base portion and provided in the inner cylindrical tube 41. By this configuration, it is possible to reduce the parts count and simplify the structure. Furthermore, in the light of the cylindrical tube 42, it is possible to prevent the combustion gas from bypassing through the peripheral surface of the filter.

INDUSTRIAL APPLICABILITY

The gas generator according to the present invention is configured as discussed above, and therefore the combustion chamber can be partitioned by fewer parts into two or more chambers which are surely not communicating with each other and are functionally independent from each other. In addition, since at least one filter element as used is disk-shaped, it is possible to provide the filter element at a low cost, assemble the gas generator with ease, and therefore substantially reduce the production cost.

What is claimed is:

1. A gas generator comprising:
   a cylindrical housing having an initiator shell provided with a plurality of igniter devices and a closure shell;
   a ring-shaped filter element provided in the housing along a circumference of an inner peripheral wall of the housing;
   a first combustion chamber formed within the ring-shaped filter element and loaded with gas generants;
   a cylindrical member configured to partition the combustion chamber into two combustion chambers; and
   a second combustion chamber formed in the cylindrical member and loaded with gas generants, wherein
   a first end side in a length direction of the cylindrical member contacts the initiator shell,
   an igniter device is provided at a portion where the initiator shell faces the second combustion chamber, and
   a disk-shaped filter element is provided at a second end side in the length direction of the cylindrical member.

2. The gas generator as claimed in claim 1 wherein
   the first combustion chamber is partitioned in the axial direction of the gas generator by a partition member to form a space at a side near the closure shell, and
   the space at the side near the closure shell and the second combustion chamber communicate with each other.

3. The gas generator as claimed in claim 1 wherein an orifice plate having a plurality of orifices is provided in the cylindrical member.

4. The gas generator as claimed in claim 1 wherein
   the first combustion chamber is partitioned in the axial direction of the gas generator by a partition member to form a space at a side near the closure shell,
   the space at the side near the closure shell and the second combustion chamber communicate with each other, and
   an orifice plate having a plurality of orifices is provided in the cylindrical member.

5. The gas generator as claimed in claim 1 wherein a plurality of orifices are integrally formed at the second end side in the length direction of the cylindrical member.

6. The gas generator as claimed in claim 1 wherein
   the first combustion chamber is partitioned in the axial direction of the gas generator by a partition member to form a space at a side near the closure shell,
   the space at the side near the closure shell and the second combustion chamber communicate with each other, and
   a plurality of orifices are integrally formed at the second end side in the length direction of the cylindrical member.

7. The gas generator as claimed in claim 2 wherein said partition member is formed as a corrugated plate in order to avoid deformation and secure a flow path of the gas generated in the cylindrical member.

8. The gas generator as claimed in claim 4 wherein said partition member is formed as a corrugated plate in order to avoid deformation and secure a flow path of the gas generated in the cylindrical member.

9. The gas generator as claimed in claim 6 wherein the partition member is formed as a corrugated plate in order to avoid deformation and secure a flow path of the gas generated in the cylindrical member.

10. A gas generator comprising:
    a cylindrical housing having an initiator shell provided with a plurality of igniter devices and a closure shell;
    a ring-shaped filter element provided in the housing along a circumference of an inner peripheral wall of the housing;
    a first combustion chamber formed in the ring-shaped filter element and loaded with gas generants;
    a cylindrical member configured to partition the combustion chamber into two combustion chambers; and
    a second combustion chamber formed in the cylindrical member and loaded with gas generants, wherein
    a first end side in a length direction of the cylindrical member contacts the initiator shell,
    an igniter device is provided at a portion where the initiator shell faces the second combustion chamber,
    a disk-shaped filter element is provided at a second end side in the length direction of the cylindrical member, and
    at least one of the combustion chambers is restricted in the axial direction of the gas generator by a non-perforated partition member.

\* \* \* \* \*